May 31, 1927.
M. V. CROKER
1,630,657
INSULATING SECTION FOR PIPES
Filed Oct. 29, 1924
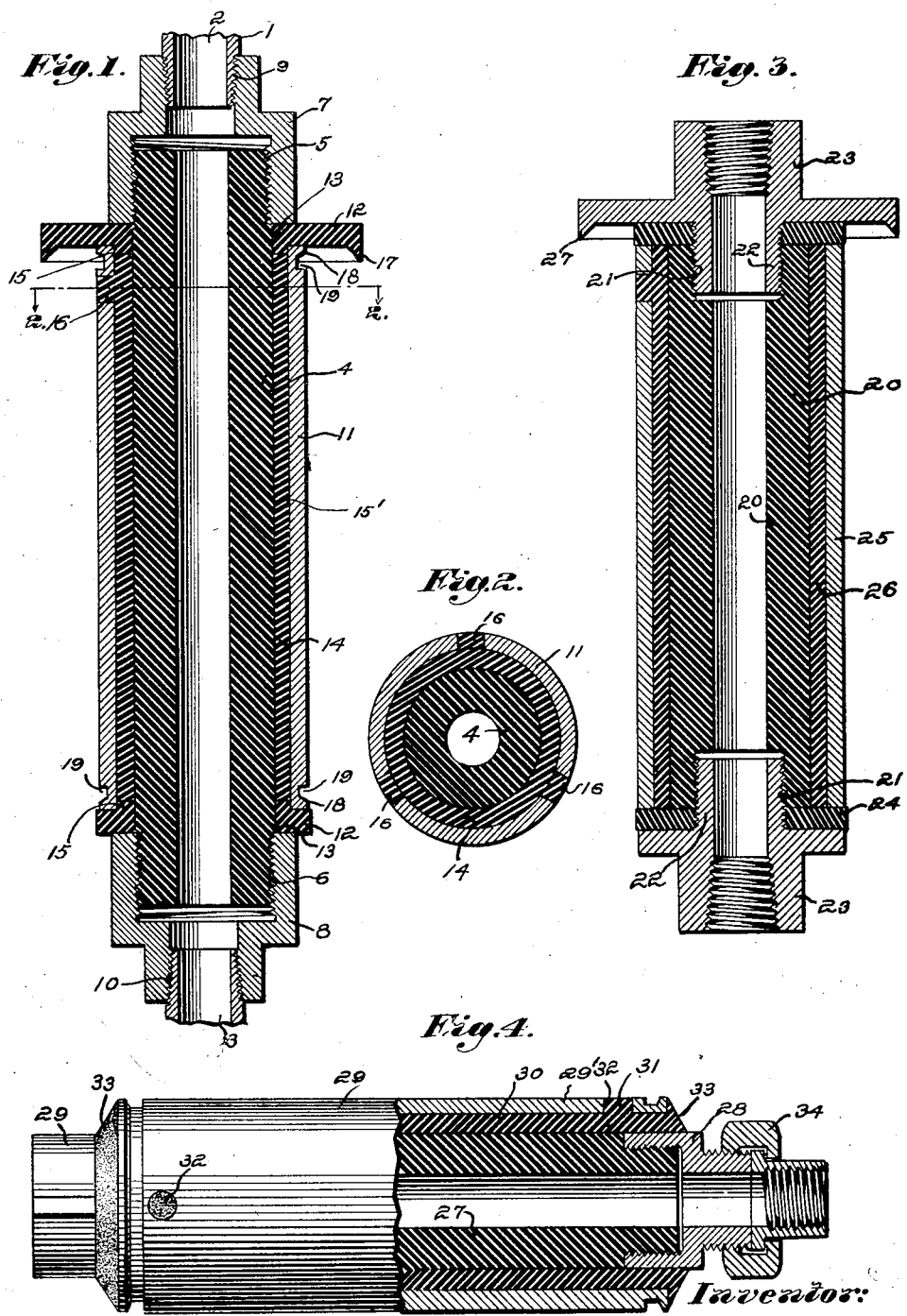
Inventor:
Mark V. Croker.

Patented May 31, 1927.

1,630,657

UNITED STATES PATENT OFFICE.

MARK V. CROKER, OF NEWTON UPPER FALLS, MASSACHUSETTS.

INSULATING SECTION FOR PIPES.

Application filed October 29, 1924. Serial No. 746,701.

This invention relates to insulating sections for pipe lines and it is among the objects of the invention to provide an insulating section possessing a superior degree of strength and durability and a very highly efficient insulator for electric currents.

In the accompanying drawings which show merely for illustrative purposes specific embodiments of my invention;

Fig. 1 is a longitudinal section of a portion of a pipe line with an insulating section embodying the preferred form of my invention inserted therein;

Fig. 2 is a transverse section taken on the line 2—2 of Fig. 1;

Fig. 3 is a longitudinal section of a modified form of insulating device; and

Fig. 4 is a longitudinal section of another form of insulating device, this form being particularly adapted for horizontal pipe lines.

In the preferred embodiment of my invention shown in Figs. 1 and 2, 1 is a pipe line including pipe ends 2 and 3 separated by a considerable gap within which is inserted a tube 4 of material capable of preventing the passage of an electric current across said gap from one of said pipe ends to the other. Any suitable material may be employed in the formation of said tube 4 but I preferably use hard rubber which is provided at its ends with screw threads 5 and 6 to engage complementary threads formed upon coupling members 7 and 8 respectively, which coupling members may in turn have screw-threaded portions 9 and 10 respectively for engagement with threads of the pipe ends 2 and 3. As a rule material that is a good non-conductor of electricity is not as strong, is more brittle and more likely to be broken than are the other metal parts of the pipe line or coupling and, to protect said tube from breakage, either accidentally or otherwise, it is desirable to provide a protecting cover, herein a sleeve 11, which surrounds at least the exposed portions of said rubber tube 4.

The sleeve 11 may be formed and supported in various ways and, in Fig. 1, I have shown one example wherein collars 12 of insulating material such as fiber, a phenolic condensation product or rubber, are bored at 13 to fit the outside of the tube 4, one of said collars being arranged preferably at each end of said sleeve 11 and of sufficient thickness to separate said sleeve from the coupling members 7 or 8 and prevent the jumping of an electric current from said couplings to said sleeve, said collars being firmly secured against the ends of the sleeve 11 by their respective couplings 7 and 8 when the latter are screwed upon the ends of the tube 4. The internal diameter of the sleeve 11 preferably exceeds the external diameter of the tube 4, thereby providing an annular space 14 entirely surrounding said tube 4 and these two sleeves may be and preferably are maintained in concentric relation during assembling at least by shoulders 15 formed upon the collars 12 and projecting from the inner faces of said collars into engagement with adjacent ends of the sleeve 11. To further reinforce the tube 4 and to prevent the accumulation of moisture in the annular space 14 between said sleeve and tube, said annular space is preferably filled with a non-conducting relatively resilient cementitious element such, for example, as sulphur 15′ which is capable of being melted and poured so as to become molded into and completely filling said space. The sleeve 11 has lateral openings 16 at appropriate points through which said sulphur may be poured into the annular space and, after cooling, any sulphur protruding from said openings is smoothed off flush with the outer face of said sleeve, completely filling said openings and preventing movement of said sulphur body.

There are times when the coupling section embodying this invention is to be used in connection with vertical pipes and other times with horizontal pipes but in either arrangement condensation is likely to form upon the outer surface of the pipe and, if permitted to form a sheet of moisture over the entire external area of the coupling section, an electric current will naturally flow from one pipe end to the other pipe. Therefore, for vertical pipes, it is desirable that a drip flange be inserted near the top of the coupling section to shed accumulated moisture rather than allow it to flow along the surface of said sleeve and one method of accomplishing this result is to extend the collar 12 outwardly and providing therefor a depending marginal lip 17. When the insulating section is to be used in a horizontal pipe the shedding of moisture is preferably effected by annular drip flanges 18 formed herein by annularly grooving said sleeve at 19 preferably near each end thereof.

In Fig. 3 I have illustrated another embodiment of my invention which comprises a central tube 20 which, instead of having external screw threads formed at opposite ends, is internally threaded at 21 to receive similarly threaded nipples 22 constituting parts of coupling sections 23 and these coupling sections are preferably separated by fiber insulating washers 24 from the ends of a protecting sleeve 25 which is likewise separated from the tube 20 by non-conducting filling 26. When vertically arranged as herein shown a drip flange 27 may, if desired, be formed integral with the upper coupling section 23.

In Fig. 4 a modified form of insulating section is illustrated comprising the insulating lining or tube 27 similar to the tube 4 of Fig. 1 which unites in any appropriate manner couplings 28 and 29. In this form, however, the insulating disks between the couplings and the protecting sleeve are omitted and instead the protecting sleeve 29' is extended over the ends of the couplings 28 and 29. An annular space 30 is provided between the tube 27 and said protecting sleeve 29' as in the previous cases and this space is completely filled with non-conducting filling 31 such, for example, as sulphur which in itself properly spaces the said sleeve from the tubing and constitutes the insulating therefor, preventing any jumping of the electric current from the coupling 28 to the sleeve 29'. Longitudinal and circumferential movements of the sleeve 29' relatively to the tube 27, at least to any great extent, are prevented by said sulphur which, as in the previous case, is preferably melted and poured into the annular space 30 and allowed, during this operation, to protrude through lateral openings 32 in said sleeve, these protruding portions being later smoothed off even with the outer face of the tool and also at opposite ends of said tube, preferably along the bevelled planes 33.

It is obviously within the scope of the invention to employ, in this connection with the insulating section, a union such as shown at 34 whereby the said insulating section may be installed or removed in a pipe line without necessitating the taking down of the greater portion thereof or the disconnecting of either end of said pipe line from whatever it may be attached. The material that is molded into or used to fill the space 14 of Figs. 1 and 2 or the similar spaces of the forms shown in Figs. 3 and 4 has been referred to as a non-conducting or insulating material. It is however to be understood that this filling material being naturally relatively more resilient than the insulating bushing or tube 4 or the outer protecting sleeve 11 acts as a non-conductor of any movements of said sleeve 11 that would be detrimental or likely to cause injury to said bushing 4. Therefore the term "insulation" as used in the specification and claims is not to be construed as referring merely to electric currents but is broad enough to cover any activities that may be set up in said outer protecting sleeve either by blows from without or expansion and contraction of the several parts of the coupling or electric currents.

While I have herein shown and described merely for illustrative purposes, specific embodiments of my invention and have disclosed and discussed in detail the constructions and arrangements incidental to such disclosures, it is distinctly to be understood that the invention is limited neither to the mere details or relative arrangement of the parts nor to the specific applications herein shown but that extensive variations from the illustrations may be made without departing from the principles thereof.

Claims:

1. An insulating section for pipes comprising a tube of insulating material, a coupling secured to each end of said tube and forming therewith a self-contained liquid conduit, a metal protecting sleeve surrounding and spaced from said tube and insulating material interposed between said tube and sleeve and between the ends of said sleeve and said couplings.

2. An insulating section for pipes comprising an insulating tube, a coupling secured to each end of said insulating tube, a protecting sleeve surrounding and spaced from said tube and relatively yieldable material arranged between said tube and said sleeve and between the ends of said sleeve and said couplings.

3. An insulating section for pipes comprising an insulating tube, a coupling threaded to each end of said insulating tube, a metallic protecting sleeve surrounding and spaced from said tube and a filling of sulphur arranged between said tube and said sleeve to insulate one from the other.

4. An insulating section for pipes comprising an insulating tube, metallic couplings secured to opposite ends respectively of said tube and forming therewith a self-contained liquid conduit, a metal protecting sleeve surrounding said insulating tube in spaced relation therewith, and means molded into said space to insulate said protecting sleeve from said tube and said couplings and maintain said sleeve in its separated relation to said tube.

5. An insulating section for pipes comprising an insulating tube, metallic couplings having screw-threaded engagement with opposite ends respectively of said tube and forming therewith a self-contained liquid conduit, a metallic sleeve surrounding said insulating tube in spaced relation thereto and with said couplings, insulating means melted and poured into the space separating said sleeve from said tube to position the one from the other and insulating collars interposed between the ends of said sleeve and said couplings.

6. An insulating section for pipes comprising an insulating bushing composed of relatively breakable material, means for coupling opposite ends of said bushing to adjacent pipe ends, means to protect said bushing against breakage including a metal sleeve surrounding said bushing and spaced therefrom, said sleeve being provided with at least one lateral opening, and an insulating filling including sulphur interposed between said sleeve and said bushing and extending through said lateral opening to prevent displacement of said sleeve.

7. An insulating section for pipes comprising an insulating bushing composed of relatively breakable material, couplings arranged at opposite ends of said bushing, a metal protecting sleeve for said bushing, insulating material interposed between said sleeve and said bushing, and insulating collars between the ends of said sleeve and said couplings, at least one of said collars having an annular drip flange.

8. An insulating section for pipes comprising an insulating bushing composed of relatively breakable material, couplings for connecting opposite ends of said bushing with adjacent pipe ends, a metal protecting sleeve for said bushing provided with an annular drip flange at least at one end, and insulations separating said sleeve from said couplings and said bushing.

9. An insulating section for pipes comprising a rubber bushing, metal couplings having screw-threaded engagement with opposite ends of said bushing, a metal protecting sleeve surrounding said bushing and in spaced insulated relation to said couplings, and a filling of sulphur interposed between said sleeve and said bushing.

10. An insulating section for liquid pipes comprising an insulating central tube, couplings screwed directly upon opposite ends of said central tube, a protective casing for said central tube and means including sulphur for insulating said protective casing from said tube and said couplings.

11. An insulating section for pipes comprising a rubber bushing, couplings having screw-threaded engagement with said bushing, a protective casing surrounding said bushing in spaced relation thereto and means for insulating said protective casing from said bushing.

12. In combination with a pipe line of an insulating bushing arranged between sections of pipe constituting said pipe line, means for coupling opposite ends of said bushing with said pipe sections and a metallic protective casing enclosing said bushing and provided at opposite ends with drip flanges.

13. In combination with a pipe line of an insulating bushing arranged between sections of pipe constituting said pipe line, means for coupling opposite ends of said bushing with said pipe sections, a metallic protective casing enclosing said bushing and provided with drip flanges adjacent its ends, and means to insulate said casing from said bushing and said coupling means.

In testimony whereof, I have signed my name to this specification.

MARK V. CROKER.